United States Patent [19]

Hawkshaw

[11] Patent Number: 4,671,472
[45] Date of Patent: Jun. 9, 1987

[54] FIRE BOMBING AND FIRE BOMBERS

[75] Inventor: John K. Hawkshaw, Brampton, Canada

[73] Assignee: Field Aviation Company Limited, Toronto, Canada

[21] Appl. No.: 759,178

[22] Filed: Jul. 26, 1985

[51] Int. Cl.$^4$ .............................................. B64D 1/16
[52] U.S. Cl. ................................... 244/136; 239/171; 239/589; 169/53
[58] Field of Search ...................... 244/136, 137 R; 239/171, 589; 169/46, 47, 53

[56] References Cited

U.S. PATENT DOCUMENTS

| | | | |
|---|---|---|---|
| 2,043,262 | 6/1936 | Oglesby et al. | 244/136 |
| 2,247,406 | 7/1941 | Raymond | 244/136 |
| 2,504,247 | 4/1950 | Bowman | 239/171 |
| 4,195,693 | 4/1980 | Busch et al. | 169/53 |

Primary Examiner—Joseph F. Peters, Jr.
Assistant Examiner—Rodney Corl
Attorney, Agent, or Firm—Fetherstonaugh & Co.

[57] ABSTRACT

A fire bomber aircraft has an elongated discharge chute which communicates with the outlet opening of liquid tank and a discharge end disposed a substantial distance below the input end. The discharge end opens from the aircraft to atmosphere such that upon movement of the closure door of the drop tank to an open position, liquid will flow through the outlet opening to form a falling stream which will accelerate to a substantial velocity before it is discharged through the discharge end to the surrounding atmosphere to thereby reduce the erosion of the body of liquid which is discharged.

21 Claims, 5 Drawing Figures

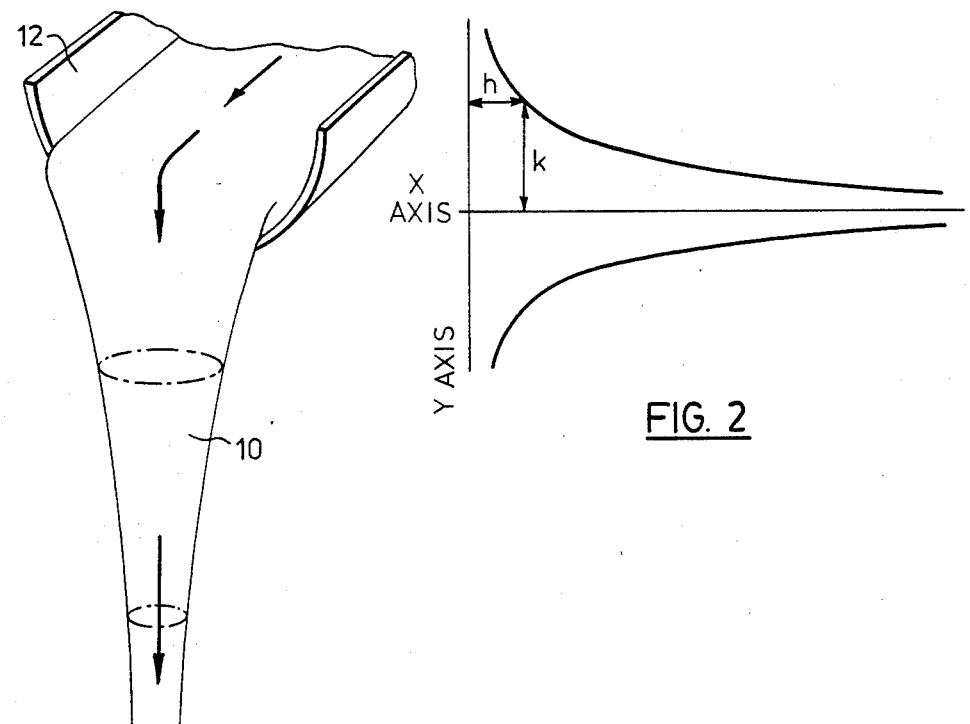
FIG 1
FIG. 2
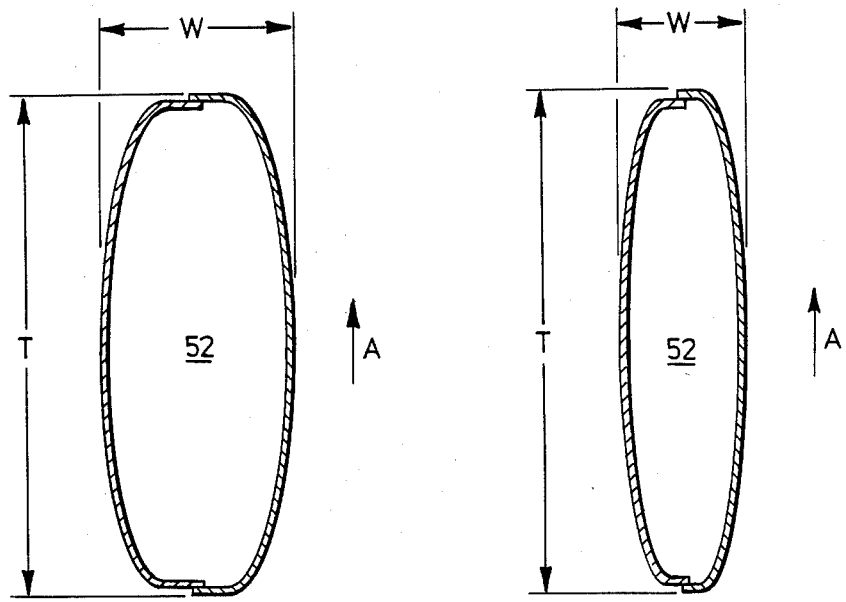
FIG. 4
FIG. 5

FIRE BOMBING AND FIRE BOMBERS

BACKGROUND OF INVENTION

In the fire bombing systems presently in use, the ground level dispersal patterns of the liquid are non-uniform. The dispersal patterns tend to be of very low wetness level at the outer edges thereof and of very high wetness level at the centre thereof. The patterns which can be achieved by the presently existing apparatus are all excessively wide.

I have found that the above difficulties result from the fact that in the present systems, the load is discharged into the airstream at a very low falling velocity. The drop tanks are located so that their discharge outlet is located at the lowest possible level with respect to the aircraft. Generally, the drop tanks are positioned just inside the aircraft skin. As a result the load initially enters the airstream at zero vertical velocity. Generally, the outlets from the drop tanks are such that the discharging stream has non-vertical velocity factors which also serve to accelerate the errosion of the stream.

I have found that I can obtain an improved ground pattern by reducing the errosion to which the discharging water load is subjected.

For a given flow rate in mass per time unit, if the velocity is low, the cross-sectional area must be high. It follows that in order to discharge a predetermined load at a predetermined rate, the cross-section of the discharging stream must be considerably higher if the velocity of the stream is very low than it need be if the velocity of the stream is relatively higher. Therefore, if a predetermined load of liquid is dropped in the form of a stream from a fire bomber, the cross-sectional area of the discharging stream for a given flow rate may be reduced if the velocity of the falling stream is increased.

I take advantage of this feature by ensuring that the liquid which is discharged into the atmosphere has a greater falling velocity than that previously provided in fire bombers.

In addition, it is well known that streamlining of an airborne object can greatly facilitate the movement of the object through the air. I effectively streamline the discharging stream of liquid by reducing the width of the stream in a direction which extends transversely to the direction of forward movement of the aircraft. Again, this serves to reduce the rate of errosion.

A further feature which contributes to the rapid rate of errosion of falling liquid streams is the entrapment of air in the falling stream. A substantial proportion of this entrapment occurs during the initial acceleration portion of the fall when the velocity of the falling stream is low. By ensuring that the initial velocity of the discharging stream is substantially higher than that previously provided, I reduce the initial entrapment. Furthermore, by shaping the discharge chute through which the falling stream is discharged to correspond to the profile of the free-falling stream, I can minimize air entrapment in the initial acceleration stage.

According to one aspect of the present invention, there is provided in a fire bomber aircraft having a drop tank in which a liquid storage compartment is formed for storing a fire retardent or fire suppresent liquid, said drop tank having an outlet opening for the liquid and closure means for closing the outlet opening, the improvement of an elongated discharge chute having a through passage which has an input end arranged to communicate with the outlet opening of said tank and a discharge end disposed a substantial distance below the input end, said discharge end opening from the aircraft to atmosphere such that upon movement of the closure means to an open position, liquid will flow through the outlet opening to form a falling stream which will accelerate to a substantial velocity before it is discharged through said discharge end to the surrounding atmosphere to thereby reduce the erosion of the body of liquid which is discharged.

According to a further aspect of the present invention, there is provided a method of aerially discharging a fire retardent or suppresent liquid from a drop tank of an airborne aircraft, the drop tank having an outlet opening therefrom and closure means for closing said outlet, comprising the steps of discharging a stream of liquid from the outlet of the drop tank to form a falling stream of liquid, isolating the falling stream of liquid from the air through which the aircraft is flying until the leading end of the falling stream is accelerated to a velocity which is substantially greater than the velocity of the liquid passing through the outlet opening of the drop tank, and thereafter, discharging the falling stream of liquid from the aircraft into the air to allow it to fall to the ground.

The invention will be more clearly understood after reference to the following detailed specification read in conjunction with the drawings wherein:

FIG. 1 is a diagram illustrating the free stream contraction of a free falling stream of liquid;

FIG. 2 is a diagram illustrating the boundary of the curve generated by the equation used for determining the configuration of the discharge chute;

FIG. 4 is a cross-sectional view taken along line 4—4 of FIG. 3.

FIG. 5 is a cross-sectional view taken along line 5—5 of FIG. 3.

Figure 3:
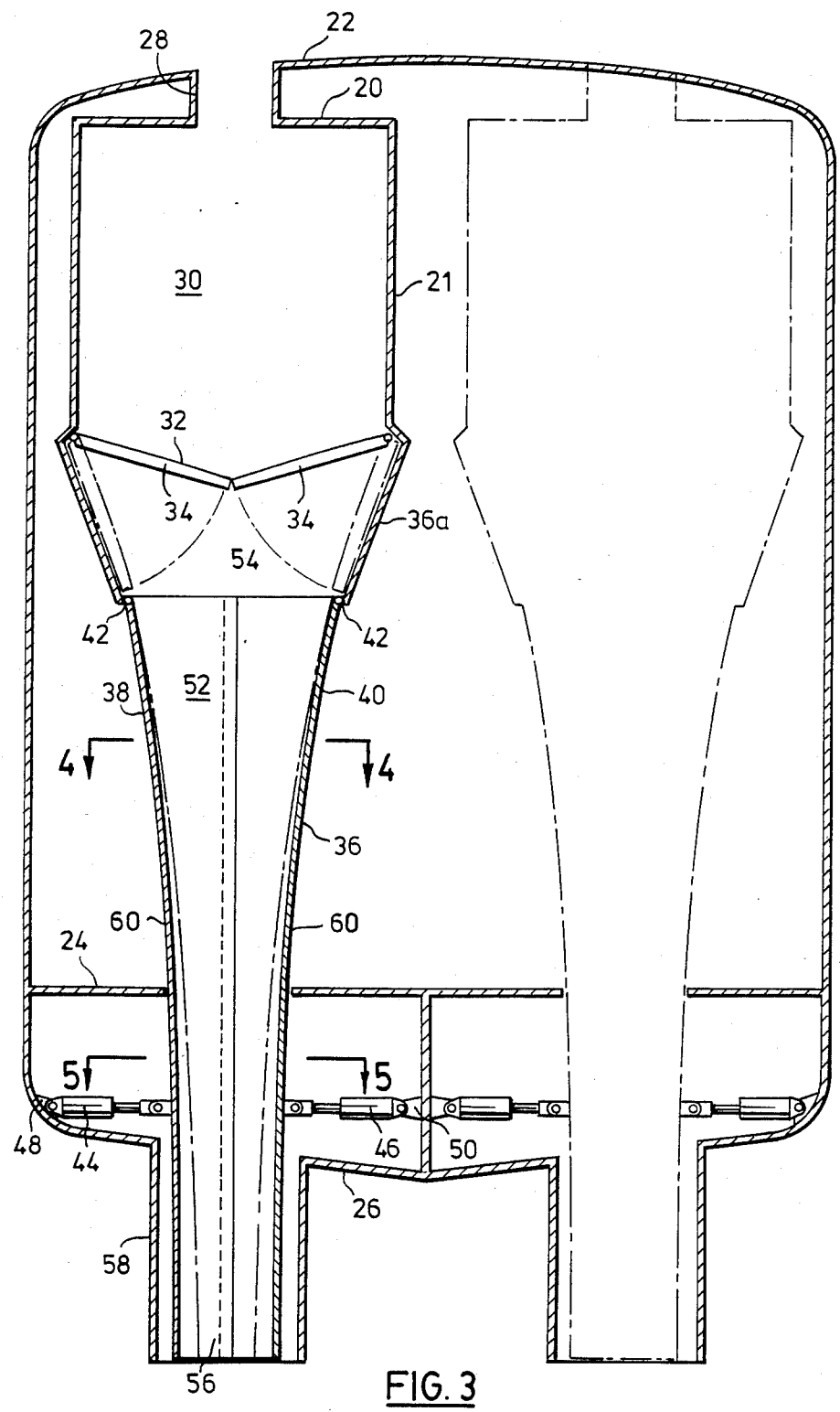
FIG. 3 is a cross-sectional view taken through an aircraft fuselage.

FIG. 1 of the drawings serves to illustrate the contraction of a stream of liquid 10 falling freely from a discharge chute 12. As the velocity of the free falling stream increases, the cross-sectional area of the stream decreases.

In free-fall, the time required for an object to fall is determined by the formula $$t = \sqrt{\frac{2H}{g}}$$

where t is the time of the fall, h is the height of the fall and g is the acceleration due to gravity.

Depending upon the nature of the target area which is to be bombed by a fire retardent or fire suppresent liquid, the load may be dropped from varying heights. However, a height of 100 feet is very common and will be used hereinafter as an example to illustrate the effects of different falling velocities.

For a load dropped from a water storage tank in which the discharge opening is located immediately adjacent the skin of the fuselage for an aircraft flying at 100 feet, the time from exposure to ground impact is $$t_1 = \sqrt{\frac{2 \times 100}{32.2}} = 2.49 \text{ seconds}$$

For a load dropped from a water storage tank which is elevated 10 feet above the discharge opening from the fuselage, on an aircraft flying at 100 feet, the time from exposure of the load to atmosphere to ground impact is $$t_2 = \sqrt{\frac{2 \times 110}{32.2}} - \sqrt{\frac{2 \times 10}{32.2}} = 1.82$$

seconds. The time difference from disharge to point of contact is 2.49−1.82=0.67 seconds. This represents a reduction of $$\frac{.67}{2.49} \times 100 = 27\%.$$

This represents a very substantial reduction in drop time and this reduction significantly reduces the errosion time. Thus is will be seen that despite the fact that the liquid storage tank may be located at a greater distance from the ground, the exposure time for the discharging load can be substantially reduced and this reduction in exposure time greatly reduces the errosion to which the falling stream is subjected.

With reference to FIG. 3 of the drawings, it will be seen that a drop tank 20 is mounted in an aircraft fuselage 22 and is spaced a substantial distance above the floor 24 of the aircraft and above the skin 26 of the underside of the fuselage. The drop tank 20 has a liquid storage compartment formed therein and an air vent 28 opening upwardly through the fuselage 22. The drop tank 20 also has an outlet opening 32 and closure doors 34 which are movable between the closed position illustrated in solid lines in FIG. 3 and the open position illustrated in broken lines.

Apart from the positioning of the drop tank within the fuselage, the structure of the drop tank and closure doors and the operating mechanism for opening and closing the closure doors may be the same as any one of a number of drop tanks presently in use.

Because of the location of the outlet opening 32 of the drop tank at an elevated position within the fuselage, I provide an elongated discharge chute 36. The discharge chute 36 has an upper portion 36*a* which is connected to the lower end of the side walls 21 of the drop tank and is formed with a recess to accommodate the closure doors when they are located in the open position.

The elongated discharge chute 36 also includes oppositely disposed chute members 38 and 40. The upper ends of the chute members 38 and 40 are hingedly connected to the lower end of the portion 36*a*. Extensible actuators 44 and 46 are provided for moving the chute members 38 and 40. The actuator 44 has one end secured to a support frame structure 48 and its other end secured to the chute member 38. The actuator 46 has one end secured to an available frame member 50 and its other end secured to the chute member 40. The actuators 44 and 46 may be hydraulically, electrically or pneumatically controlled and are operable to move the chute members 36 between the positions shown in solid lines and the positions shown in broken lines in FIG. 3.

The chute 36 has a through passage 52 which has an input end 54 arranged to communicate with the outlet opening 32 of the drop tank and a discharge end 56.

While virtually any length of discharge chute will serve to increase the falling velocity of the liquid before it is discharged, I prefer to ensure that the length of the discharge chute 36 and therefore the length of the through passage 52 is greater than the vertical drop of the closure doors 32 when they are moved from their open position to their closed position.

In order to protect the portion of the chute 36 which projects through the underside of the fuselage, I provide an external chute shield which is mounted on the fuselage and projects downwardly therefrom. The chute shield 58 may be in the form of a strong rigid tubular member.

As illustrated in FIG. 3 of the drawings, the outer side walls 60 of the chute members 38 and 40 are longitudinally curved. In addition, as shown in FIGS. 4 and 5 of the drawings, the cross-sectional area of the through passage 52 is progressively reduced. The chute members 38 and 40 are proportioned such that the progressive reduction in cross-sectional area of the through passage 52 substantially corresponds to the free-stream contraction of the discharging stream of liquid.

FIG. 2 serves to illustrate the arc of curvature of a free-falling stream. If the stream is falling along the X-axis, in one dimensional contraction, the equation for the boundary of the curve is $$y^2 = \frac{k^2 h}{x}$$

where h and k are the parameters "sizing" the curve to a particular tank. K may be half the width of the exit area and h may be the level within the tank from which, if all the water contained in the tank is dropped, would pass through the exit area at a velocity which is the average velocity of the total load.

In practice, I prefer to change the proportions of the cross-section of the through passage 52 to match or substantially match the proportions of the cross-section of a free-falling stream of liquid from the tank.

For the purposes of streamlining the discharge stream, I prefer to shape the discharge chutes 38 and 40 so as to progressively decrease the width of the discharging stream . This reduction in width can be achieved without having to increase the fore and aft thickness of the stream because as previously described, the cross-sectional area of the stream is decreasing progressively as it falls. The width of this discharging stream being measured in a direction transverse to the direction of the travel of the air stream through which it is discharged and the thickness being measured in the direction of the arrow A which indicates the direction of forward motion of the aircraft. As shown in FIGS. 4 and 5, while the total cross-sectional area decreases, the rate of decrease of the width W is substantially greater than the rate of decrease of the thickness T.

In use, the liquid storage compartment 30 of the drop tank 20 is loaded in a conventional manner and the chute members 38 and 40 are adjusted to the spacing required to ensure that the reduction in cross-sectional area of the through passage 52 substantially corresponds to that required to minimize air entrapment during the free fall of the liquid.

The aircraft then flies over the target area and the closure doors 34 are opened to open the outlet opening 32 of the drop tank 20. The liquid is then discharged in a free falling stream through the outlet opening into the discharge passage 52. The velocity of the falling stream will increase from an initial zero velocity at the outlet opening 32 to a substantial discharge velocity at the discharge end 56. Once the discharge of the liquid has commenced, the discharge velocity of the stream passing through the outlet opening 32 will be greater than zero, however, the discharge velocity at the discharge end 56 will continue to be substantially greater than the velocity of the stream passing through the outlet opening 32.

When the load discharges through the discharge end 56 of the chute, it enters the air stream through which the aircraft is flying and at this point, the errosion of the load commences. By discharging the load at an increased initial velocity, a substantial reduction in errosion is achieved.

A characteristic of a discharging stream of liquid is that the lower portions of the stream drop away from the upper portions leaving air gaps therebetween. This phenomenum is known as "load stretch".

By causing the discharging stream to fall through a protected area of the fuselage within a chute, the cross-sectional area of which decreases proportionally as the velocity increases, such that substantially no air is allowed to become entrained, the cross-sectional area of the load can be reduced without difficulty and streamlining imparted to the load. The stream which is discharged from the discharge end of the chute will enter the air stream with a cross-sectional area which is substantially less than that of a corresponding load discharged from a conventional tank. By effecting all or substantially all of the reduction in cross-sectional area by reducing the width of the stream, leaving the thickness (fore and aft) dimension constant, the frontal width is even more substantially reduced.

Because the fluid is required to fall through the chute for a substantial distance, it will be apparent that substantially all of the non-vertical vectors can be eliminated.

As the discharging stream of liquid enters the air stream with a substantial initial velocity, the time of travel to the target area is substantially reduced. It can be readily demonstrated that the load stretch, described above, while constant per unit of time, keeps decreasing per unit of distance. Consequently, the greatest stretch takes place in the early part of the fall where substantially no air entrainment is permitted and the stretch which occurs after the stream enters the air stream is reduced and this results in a reduction in air entrainment.

It will be understood that while a single drop tank may be located in a small aircraft, a plurality of drop tanks may be located in a larger aircraft.

To intentionally vary the ground wetness level for different intensities of fire, the chute width may be altered. Preferably, when the chute members are arranged in their maximum width position, their curvature and profile are such as to most closely approach the condition which will provide little or no flow restriction resulting from the passage of liquid therethrough. The narrowest position may correspond to that required to provide a flow rate which is restricted so that the ground wetness level is that of the minimum required for low intensity fires.

In a multi-tank installation, the ground wetness level may be varied not only by varying the chute width but also by dumping one or more tanks simultaneously.

The dropping sequence may be computer controlled with the computer being programmed to vary the chute width and tank discharge selection sequence from maximum wetness of maximum chute width and all tanks in a "salvo" drop to minimum wetness of minimum chute width and suitably time spaced successive "train" drops.

These and other variations of the present invention will be apparent to those skilled in the art.

For example, it will be apparent that while the provision of an adjustable chute structure has a number of distinct advantages, a very substantial improvement in fire bombing can be achieved by utilizing a chute structure in which the side walls are fixed in relation to one another. It will also be apparent that the closure doors may open by hinging along the centerline of the tank to open downwardly thereof, in which case the chute hinges may then be located at the tank level.

I claim:

1. In a fire bomber aircraft having a drop tank in which a liquid storage compartment is formed for storing a fire retardent or fire suppressant liquid, said drop tank having an outlet opening for the liquid and closure means for closing the outlet opening, the improvement of;

an elongated discharge chute having a through passage which has an input end arranged to communicate with the outlet opening of said tank and a discharge end disposed a substantial distance below the input end, said discharge end opening from the aircraft to atmosphere such that upon movement of the closure means to an open position, liquid will flow through the outlet opening to form a falling stream which will accelerate to a substantial velocity before it is discharged through said discharge end to the surrounding atmosphere to thereby reduce the erosion of the body of liquid which is discharged, the width of the through passage is progressively reduced from its input end to its discharge end to effect a progressive reduction in cross-sectional area whereby the discharging stream of liquid has a width in a direction transverse to the direction of travel of the air stream through which it is discharged which is less than its thickness in the direction of forward motion of the aircraft.

2. A fire bomber aircraft as claimed in claim 1, wherein said cross-sectional area of the through passage decreases in a direction away from said input end in direct proportion to the increase in velocity of free falling liquid discharging therethrough in use so as to effect the reduction in cross-sectional area without air entrapment occuring in the falling liquid.

3. A fire bomber as claimed in claim 1, wherein the elongated chute comprises at least two chute members which are disposed in a face-to-face relationship, each chute member having an upper end hingedly mounted adjacent the outlet opening of the tank and means for moving the chute members toward and away from one another to increase or decrease the proportions of the through passage in use.

4. A fire bomber as claimed in claim 3, wherein the aircraft has a fuselage upon which a tubular shield is mounted and arranged to project downwardly therefrom coaxial with and spaced outwardly from said chute so as to prevent direct impingement of said air stream on the chute.

5. A fire bomber as claimed in claim 1, wherein the aircraft has a fuselage compartment which has a substantially greater height than said storage tank and wherein said storage tank is located in an upper portion of said compartment so as to permit said elongated chute to extend downwardly to a substantial distance from the storage tank within the fuselage compartment before opening through the fuselage whereby a substantial proportion of the chute is protected against exposure to the airstream through which the aircraft flies in use.

6. A fire bomber as claimed in claim 1, wherein the dimensions of the through passage in the direction of forward motion progressively decreased from the input end to the discharge end at a rate which is less than that at which its width decreases.

7. In a fire bomber aircraft having a drop tank in which a liquid storage compartment is formed for storing a fire retardent or fire suppressant liquid, said drop tank having an outlet opening for the liquid and closure means for closing the outlet opening, the improvement of an elongaged chute comprising at least two chute members which are disposed in a face-to-face relationship to form a through passage therebetween which has an input end arranged to communicate with the outlet opening of said tank and a discharge end disposed a substantial distance below the input end, each chute member having an upper end hingedly mounted adjacent the outlet opening of the tank and means for moving the chute members toward and away from one another to increase or decrease the proportions of the through passage in use, said discharge end opening from the aircraft to atmosphere such that upon movement of the closure means to an open position, liquid will flow through the outlet opening to form a falling stream which will accelerate to a substantial velocity before it is discharged through said discharge end to the surrounding atmosphere to thereby reduce the erosion of the body of liquid which is discharged.

8. A fire bomber aircraft as claimed in claim 7, wherein said elongated chute is longitudinally tapered so as to decrease the cross-sectional area of the through passage from the input end to the output end.

9. A fire bomber as claimed in claim 8, wherein the width of the through passage is progressively reduced to effect the reduction in cross-sectional area whereby the discharging stream of liquid has a width in a direction transverse to the direction of travel of the air stream through which it is discharged which is less than its thickness in the direction of forward motion of the aircraft.

10. A fire bomber as claimed in claim 7, wherein the width of the through passage is progressively reduced to effect the reduction in cross-sectional area whereby the discharging stream of liquid has a width in a direction transverse to the direction of travel of the air stream through which it is discharged which is less than its thickness in the direction of forward motion of the aircraft.

11. A fire bomber aircraft as claimed in claim 7, wherein said cross-sectional area of the through passage decreases in a direction away from said input end in proportion to the increase in velocity of free falling liquid discharging therethrough in use so as to effect the reduction in cross-sectional area without air entrapment occuring in the falling liquid.

12. A fire bomber as claimed in claim 7, wherein the aircraft has a fuselage upon which a tubular shield is mounted and arranged to project downwardly therefrom coaxial with and spaced outwardly from said chute so as to prevent direct impingement of said air stream on the chute.

13. A fire bomber as claimed in claim 7, wherein the aircraft has a fuselage compartment which has a substantially greater height than said storage tank and wherein said storage tank is located in an upper portion of said compartment so as to permit said elongated chute to extend downwardly to a substantial distance from the storage tank within the fuselage compartment before opening through the fuselage whereby a substantial proportion of the chute is protected against exposure to the airstream through which the aircraft flies in use.

14. In a fire bomber aircraft having a drop tank in which a liquid storage compartment is formed for storing a fire retardent or fire suppressant liquid, said drop tank having an outlet opening for the liquid and closure means for closing the outlet opening, the improvement of;

an elongated discharge chute having a through passage which has an input end arranged to communicate with the outlet opening of said tank and a discharge end disposed a substantial distance below the input end, said discharge end opening from the aircraft to atmosphere such that upon movement of the closure means to an open position, liquid will flow through the outlet opening to form a falling stream which will accelerate to a substantial velocity before it is discharged through said discharge end to the surrounding atmosphere to thereby reduce the erosion of the body of liquid which is discharged, said aircraft having a fuselage compartment which has a substantially greater height than said storage tank and wherein said storage tank is located in an upper portion of said compartment so as to permit said elongated chute to extend downwardly to a substantial distance from the storage tank within the fuselage compartment before opening through the fuselage, whereby a substantial proportion of the chute is protected against exposure to the airstream through which the aircraft flies in use.

15. A fire bomber aircraft as claimed in claim 14, wherein said elongated chute is longitudinally tapered so as to decrease the cross-sectional area of the through passage from the input end to the output end.

16. A fire bomber as claimed in claim 14, wherein the width of the through passage is progressively reduced to effect the reduction in cross-sectional area whereby the discharging stream of liquid has a width in a direction transverse to the direction of travel of the air stream through which it is discharged which is less than its thickness in the direction of forward motion of the aircraft.

17. A fire bomber aircraft as claimed in claim 14, wherein said cross-sectional area of the through passage decreases in a direction away from said input end in proportion to the increase in velocity of free falling liquid discharging therethrough in use so as to effect the reduction in cross-sectional area without air entrapment occuring in the falling liquid.

18. A fire bomber as claimed in claim 14, wherein the elongated chute comprises at least two chute members which are disposed in a face-to-face relationship, each chute member having an upper end hingedly mounted adjacent the outlet opening of the tank and means for moving the chute members toward and away from one another to increase or decrease the proportions of the through passage in use.

19. A fire bomber as claimed in claim 14, wherein the aircraft has a fuselage upon which a tubular shield is mounted and arranged to project downwardly therefrom coaxial with and spaced outwardly from said chute so as to prevent direct impingement of said air stream on the chute.

20. A fire bomber as claimed in claim 14, wherein the aircraft has a fuselage compartment which has a substantially greater height than said storage tank and wherein said storage tank is located in an upper portion of said compartment so as to permit said elongated chute to extend downwardly to a substantial distance from the storage tank within the fuselage compartment before opening through the fuselage whereby a substantial proportion of the chute is protected against exposure to the airstream through which the aircraft flies in use.

21. A method of aerially discharging a fire retardent or suppresent liquid from a drop tank of an airborne aircraft, the drop tank having an outlet opening therefrom and closure means for closing said outlet, comprising the steps of;
  (a) discharging a stream of liquid from the outlet of the drop tank to form a falling stream of liquid which has a fore to aft length extending in the direction of forward motion of the aircraft and a width extending transversely of said length,
  (b) containing the falling stream of liquid along its length to isolate it from the air through which the aircraft is flying until the leading end of the falling stream is accelerated to a velocity which is substantially greater than the velocity of the liquid passing through the outlet opening of the drop tank to substantially reduce the air entrapment in the falling stream and thereby minimize erosion prior to discharge, and simultaneously progressively reducing said width of the stream (in a direction which extends transversely of the direction of forward movement of the aircraft) relative to said length of this stream to streamline the falling stream in the direction of forward movement of the aircraft before the stream is exposed to the air through which the aircraft is flying to further reduce the erosion of the falling stream.

* * * * *